United States Patent [19]
Pennino

[11] 3,987,574
[45] Oct. 26, 1976

[54] FISHING ROD AND TACKLE CARRIER

[75] Inventor: Peter Pennino, Oak Park, Ill.

[73] Assignee: Lawrence Peska Associates, Inc., New York, N.Y.; a part interest

[22] Filed: Sept. 8, 1975

[21] Appl. No.: 611,444

[52] U.S. Cl. .................................. 43/26; 43/54.5 R
[51] Int. Cl.² ........................................ A01K 97/08
[58] Field of Search .................. 43/26, 21.2, 54.5 R, 43/25, 25.2; 224/5 E, 45 R; 206/315, 443, 478, 480

[56] References Cited
UNITED STATES PATENTS

| | | |
|---|---|---|
| 2,595,230 | 5/1952 | Daviau .................................... 43/26 |
| 2,999,622 | 9/1961 | Durham ................................ 224/45 |
| 3,603,019 | 9/1971 | Smeltzer ............................. 43/21.2 |

*Primary Examiner*—Warner H. Camp
*Attorney, Agent, or Firm*—Jack D. Slobod

[57] ABSTRACT

An elongated cylindrical container has plural angularly spaced bifurcated hooks projecting radially near both ends of the container for engaging plural longitudinally directed fishing rod and reel assemblies angularly spaced about the circular periphery of the container. The container has a cap closure at one end and receives a compartmented tray for fishing tackle. A handle projects radially from the middle of the container angularly between two of the hooks.

2 Claims, 3 Drawing Figures

FISHING ROD AND TACKLE CARRIER

FIELD OF THE INVENTION

The present invention relates generally to an elongated member for carrying plural fishing rod and reel assemblies spaced apart about the periphery of the member. In its particular aspects, the present invention relates to the provision of the elongated member as a hollow container for tackle.

BACKGROUND OF THE INVENTION

In carrying several fishing rod and reel assemblies at the same time, it frequently occurs that the fishing lines of the various rods may become entangled. Further, there is frequently no convenient place to store small items of equipment associated with the fishing rods such as fishing tackle.

The prior art is already aware of U.S. Pat. No. 3,674,190 to Wright which carries plural fishing rod and reel assemblies along a backbone member. However, the device of Wright is both complicated in regard to the purposes of the present invention and does not provide a place for storing fishing tackle.

OBJECTS OF THE INVENTION

It is an object of the present invention to provide a backbone type carrier for carrying fishing rods in spaced relationship which is hollow and is configured for containing small items of equipment.

It is a further object of the present invention to provide a simple and inexpensive carrier for plural fishing rod and reel assemblies and for small items of equipment such as fishing tackle.

SUMMARY OF THE INVENTION

Briefly, the aforementioned and other objects of the present invention are satisfied by providing an elongated hollow cylindrical container which has a cap closure at one end. The container provides space for storing small items of equipment. Plural clasp means are disposed angularly about the periphery of the container for engaging plural angularly spaced, longitudinally directed fishing rod and reel assemblies.

Further, a handle is formed projecting radially from the container approximately midway along the length thereof to enable the plural rod and reel assemblies and the small items of equipment to be simultaneously carried.

Other objects, features and advantages of the present invention will become apparent upon perusal of the following detailed description of the preferred embodiment thereof when taken in conjunction with the appended drawing wherein.

DETAILED DESCRIPTION

Figures 1, 2, 3:
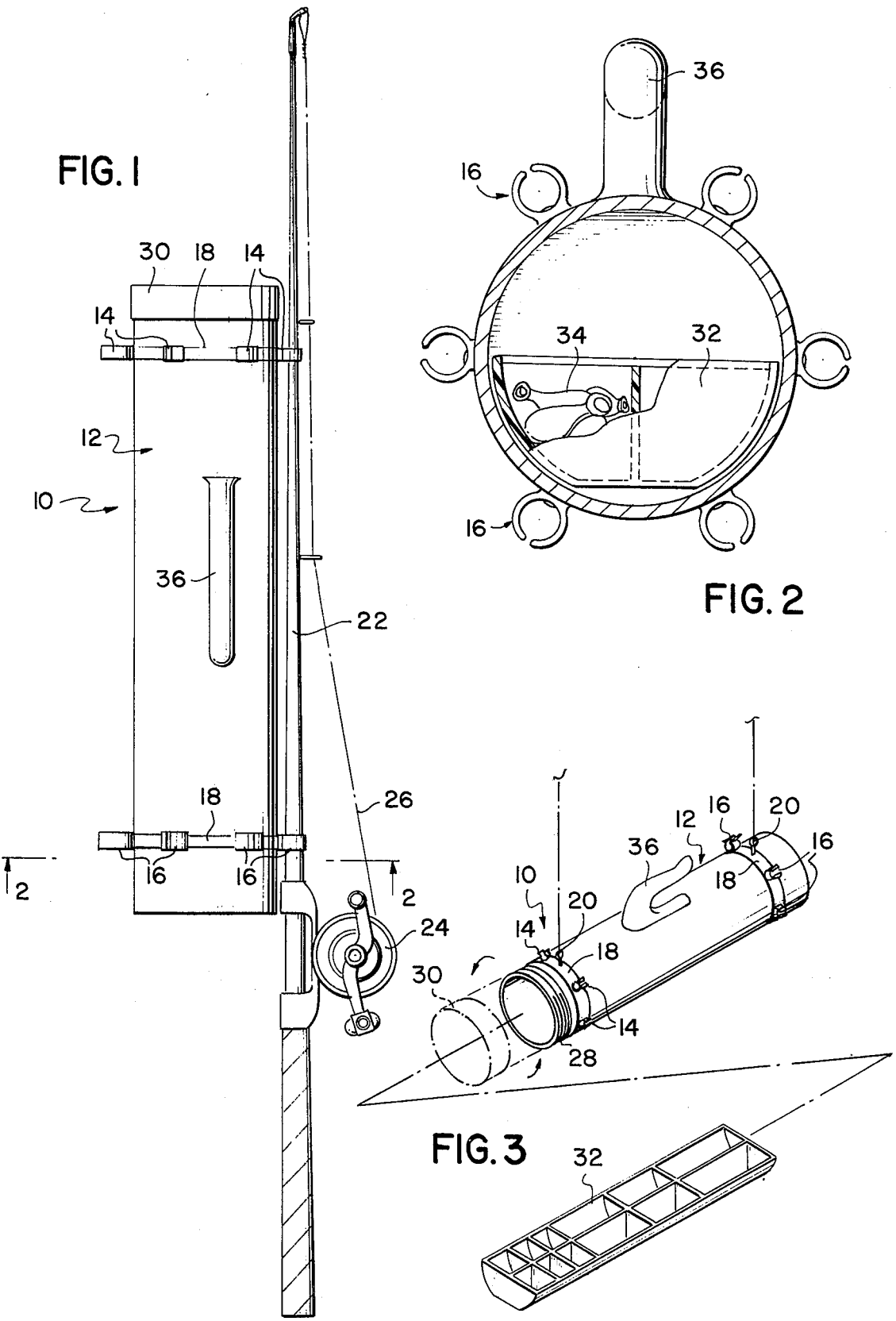
FIG. 1 is a side elevation of the carrier of the present invention in conjunction with a rod and reel assembly.
FIG. 2 is a cross-sectional view through the line 2—2 of FIG. 1.
FIG. 3 is a pictorial exploded view of a carrier of FIG. 1.

Referring to FIGS. 1 through 3 of the drawing, the carrier or caddy 10 of the present invention comprises an elongated cylindrical container 12 which is preferably about twenty-four inches in length and four inches in diameter.

Six bifurcated hook or clasp members 14 project radially from the periphery of container 12 near the top end thereof in angularly spaced relationship. Similarly, six bifurcated hook or clasp members 16, project radially from container 12 near the bottom end angularly spaced in line longitudinally with clasp members 14. The clasp members 14 and 16 are each carried spaced along a different metal ring 18 secured about the periphery of container 16 by rivets 20.

Clasp members 14 have circular openings smaller than those of clasp members 16 for engaging the tapering cross-section of a fishing rod 22 at two longitudinally spaced locations along the rod. The rods 22 have reels 24 attached thereto.

It should be apparent that six fishing rods 22, directed longitudinally of container 12 may be engaged by each longitudinally aligned pair of hooks 14 and 16. Thus, six rods 22, may be carried angularly spaced about container 12 to prevent fishing lines 26 of the various rods from becoming entangled.

One end of the container 12 has external threads 28 for receiving a screw-on end cap 30. The interior of container 12 receives an elongated tray 32 of generally semi-circular cross-section. The tray 32 is compartmented to segregate various small items of equipment such as fishing tackle 34.

Further, a handle 36 is formed radially projecting from the side of container 12, approximately mid way along the length of the container. The handle 36 is located angularly between two sets of the hook members 12 and 14 in order to avoid interfering with the plural fishing rods 22 carried along the container.

It should now be apparent that a carrier 10 has been devised for simultaneously carrying plural rod and reel assemblies in spaced apart relationship and for simultaneously carrying fishing tackle.

While the preferred embodiment of the present invention has been described in specific detail, it should be understood that numerous modifications, additions and omissions in the details thereof are possible within the intended spirit and scope of the invention claimed herein.

What is claimed is:

1. A carrier device for a plurality of fishing rods and fishing tackle comprising: an elongated cylindrical container for holding tackle; plural clasp means projecting radially outward from said container in angularly spaced apart relationship; each said clasp means being configured for engaging a fishing rod and for maintaining said fishing rod directed longitudinally along the periphery of said container; a closure means at one end of said container; and a handle means projecting radially and fixedly from said container at a location angularly intermediate two of said clasp means.

2. The device of claim 1 further comprising an elongated compartmented tray for holding tackle; said tray being removeably receivable within the interior of said container.

* * * * *